(12) United States Patent
Ma

(10) Patent No.: US 7,756,766 B2
(45) Date of Patent: Jul. 13, 2010

(54) METHOD AND APPARATUS FOR PRICE SETTING

(75) Inventor: Sherman Ching Ma, Diamond Bar, CA (US)

(73) Assignee: Juno Holdings N.V., Amsterdam (NL)

( * ) Notice: Subject to any disclaimer, the term of this patent is extended or adjusted under 35 U.S.C. 154(b) by 544 days.

(21) Appl. No.: 11/006,823

(22) Filed: Dec. 8, 2004

(65) Prior Publication Data

US 2005/0177474 A1 Aug. 11, 2005

Related U.S. Application Data

(63) Continuation of application No. 09/637,865, filed on Aug. 15, 2000, now abandoned.

(30) Foreign Application Priority Data

Oct. 1, 1999 (AU) .................................. PQ3189

(51) Int. Cl.
G06Q 40/00 (2006.01)

(52) U.S. Cl. ............................ 705/35; 705/36; 705/37; 705/26

(58) Field of Classification Search .................. 705/27, 705/26, 36–37
See application file for complete search history.

(56) References Cited

U.S. PATENT DOCUMENTS

| | | | | |
|---|---|---|---|---|
| 3,581,072 A | * | 5/1971 | Nymeyer .................... | 705/37 |
| 6,584,451 B1 | * | 6/2003 | Shoham et al. ............... | 705/37 |
| 6,606,608 B1 | * | 8/2003 | Bezos et al. .............. | 705/36 R |
| 6,629,082 B1 | * | 9/2003 | Hambrecht et al. ........ | 705/36 R |
| 6,993,504 B1 | * | 1/2006 | Friesen et al. ................. | 705/37 |
| 7,107,230 B1 | * | 9/2006 | Halbert et al. ................ | 705/26 |

* cited by examiner

*Primary Examiner*—Harish T. Dass
(74) *Attorney, Agent, or Firm*—Stites & Harbison PLLC; Marvin Petry; Stephen J. Weyer

(57) ABSTRACT

The present invention provides a method of and apparatus for setting a selling price of each of a plurality of items to be subsequently offered for sale to a plurality of prospective purchasers, the method including: accepting a plurality of expressions of interest in the items, each of the expressions of interest nominating at least a number of the items and an offer price; then determining a moving price from a plurality of factors including at least the plurality of nominated numbers of items and offer prices; then issuing the moving price on demand to the prospective purchasers; repeating the above steps; and then establishing the selling price based on the moving price and issuing the selling price.

29 Claims, 2 Drawing Sheets

METHOD AND APPARATUS FOR PRICE SETTING

This application is a continuation of U.S. application Ser. No. 09/637,865, filed Aug. 15, 2000 now abandoned.

BACKGROUND OF THE INVENTION

The present invention relates to a method and apparatus for setting prices, of particular but by no means exclusive application in the price setting of financial instruments.

The existing method for setting the prices of, for example, financial instruments varies from either a "black box" approach or a manually intensive approach requiring significant human intervention. For example, before shares of companies are listed on a stock exchange, a panel of securities dealers confer with various investors before setting an offering price. In the case of some fixed interest securities, an auction—requiring staff to take the orders of various institutional and retail investors—is conducted to determine the ultimate price of the securities.

Both of these procedures result in less than optimal outcomes for all participants. For example, the issuers of financial instruments will not know how much money will be raised (in the case of shares) or what interest rate they will have to pay (in the case of fixed interest) until the actual date of issue. At the same time, although interested investors will have an idea of what they believe the securities are worth, the ultimate price on which to base their assessment will not be known until the closing of the transaction. For securities dealers that are acting as intermediaries between issuers and investors, discussions on what price or interest rate the issuer is willing to bear and what price the investors are willing to pay only provide a far from reliable indication.

There are severe consequences for all parties if this price setting procedure is not handled correctly. For example, a company may only wish to sell shares in the company if the price exceeds some minimum price. If the price of these shares falls below the minimum threshold level on the day of closing the transaction, the issuance may be cancelled resulting in wasted costs as well as other less tangible costs (such as damaged reputation). Alternatively, if the pricing is set too low, then the issuer will not have raised the maximum possible proceeds, as a share that experiences spectacular gains on its first day of trading implies demand far outstripping supply. This often occurs, and it is not unknown for a particular issue to be as high as ten times oversubscribed.

At present, securities dealers employ a number of procedures to help address these shortcomings of the existing book building system. For example, many securities dealers have "greenshoe" provisions, where a securities dealer will purchase shares to help support the stock price if the original pricing was incorrect. In many instances, large institutional purchasers will immediately sell their shares looking to turn a quick profit. This damages the performance of the shares and causes undue volatility in the prices of financial instruments.

Consider the following situation. A private, medium-sized domestic transportation company, ABC Transport Ltd, has determined its customers are increasingly doing more cross-border deliveries. After extensive partnership discussions, the company has decided to establish international operations on its own. However, the company needs to raise capital to fund its expansion. The company approaches a securities dealer for advice.

The company has the option of issuing more shares to raise equity capital or it can borrow by issuing notes and paying an annual interest rate. The company has estimated that it will require $50 million for its purposes. After considerable thought, the company decides to issue additional shares in the company.

Since this is a new company, the securities dealer must first estimate the value of the company. This involves engaging various third party service providers such as accountants to review the financial statements of the company, independent valuers and in some cases industry consultants to project future operating results. These results are typically published as a prospectus that can be distributed to any interested investors.

When the prospectus is completed, the securities dealer as well as the issuer will then estimate a price for the shares of the company. This share price estimate will be communicated to prospective investors and interest for the share issue will begin to be tabulated by the securities dealer (i.e. "book building"). Early interest from various investors will provide some indication whether the set price of the shares is acceptable. In many cases, the indicative share price will vary from securities dealer to securities dealer in the lead-up to the actual listing of the shares.

The share price during this period is adjusted based on the experience of the securities dealer. Also, prior to the listing of the shares, the securities dealer is inundated with telephone calls and faxes from the issuer and the investor community for the latest updates on share price and share availability.

As the shares begin trading on a stock exchange, the issuer is hoping they have raised the maximum amount of proceeds from selling interests in itself to the public, the investor is hoping they have purchased a good investment at the right price and the securities dealer is hoping everything goes off without a hitch as its reputation is at stake.

Getting the share price right is critical if the interests of all parties are to be met. Many times, the share price can double or even triple on the first day of trading. This would imply that the company may not have raised as much cash as it could have as investors appear to have been willing to accept a higher price. In some cases, the share price can fall on the first day of trading. In this situation, investors may feel cheated and any future fund raisings by the issuer may be poorly greeted. In both situations, the securities dealer's business would also suffer. It is more often the case than not that financial securities are not priced perfectly.

It is an object of the present invention therefore to provide a method and apparatus for setting a selling price by employing input from prospective purchasers.

SUMMARY OF THE INVENTION

According to a first broad aspect of the present invention there is provided a method of setting a selling price of each of a plurality of items to be subsequently offered for sale to a plurality of prospective purchasers, including:

1) accepting a plurality of expressions of interest in said items, each of said expressions of interest nominating at least: i) a number of said items and ii) an offer price;
2) then determining a moving price from a plurality of factors including at least said plurality of nominated numbers of items and offer prices;
3) then issuing said moving price on demand to said prospective purchasers;
4) repeating steps 1 to 3; and
5) then establishing said selling price based on said moving price and issuing said selling price.

An "item" may be any vendible good, service, financial instrument, property, share, debt, loan, option, etc.

Thus, the moving price may (and generally will) change each time steps 1 to 3 are repeated. The "selling price" is referred to is this manner as—most obviously in the simple case where it is a weighted average of the nominated offer prices—it is directly indicative of supply and demand, and therefore represents a measure of the notional free market price. However, it will be understood that the "selling price" need not be the price at which the items are subsequently sold, though the price at which the items are subsequently sold is preferably derived from this selling price based on a previously established mathematical relationship and/or the subjective experience of the users of the method. The "selling price" may merely be the last moving price made available to the prospective purchasers. The price at which the items are actually purchasable or sold subsequently may differ from this "selling price", as will be discussed below.

Preferably said method includes setting said selling price equal to the value of said moving price immediately before said items are made available for actual purchase.

The final selling price will be established, generally, on the basis of the moving price immediately before the items are released (i.e. made available for actual purchase).

Preferably said method includes setting said moving price at a minimum clearing price, being the price at which, if all expressions of interest nominating that price or higher were ultimately filled, all of said items would be sold.

Alternatively, said moving price is the weighted mean of said nominated offer prices, weighted according to said respective nominated number of items.

Thus, the moving price may be set to a minimum clearing price, a weighted mean of the expressions of interest, or any suitable alternative. In some embodiments, the step of setting said selling price includes a combination of rules or conditions. For example, a minimum clearing price may used subject to the rule that the selling price must be between predetermined limits.

An expression of interest need not be received from the same set of prospective purchasers each time steps 1 to 3 are repeated. Further, a prospective purchaser may not make an expression of interest, but rather await the release of the items and consider whether to purchase at that time.

The method may include other rules, similarly on the nature of the prospective purchaser or the expression of interest of a prospective purchaser. For example, the method may include offering a discount to prospective purchasers who place an expression of interest, as against those who await the establishing of the selling price before purchasing.

Preferably said method includes providing a withdrawal mechanism for withdrawing an expression of interest and/or a modifying mechanism for modifying an expression of interest.

Thus, a prospective purchaser may conclude from the moving price that the items will be too expensive, and so wish to withdraw or modify his/her/its/their expression of interest.

Preferably said method includes accepting said expressions of interest including one or more alert criteria, and alerting said respective prospective purchaser who has placed said expression of interest, if one of said alert criteria is violated.

Preferably said method includes accepting said expressions of interest including one or more withdrawal criteria, and withdrawing said respective expression of interest if one of said withdrawal criteria is violated.

Preferably said alert criteria and/or said withdrawal criteria include one or more of a maximum price, a minimum price, and an expiry date.

Thus, if the moving price exceeds the maximum price or falls below the minimum price, or the expression of interest reaches a specified age (i.e. the release date is later than desired by the prospective purchaser), the expression of interest will be withdrawn, or the prospective purchaser who placed the expression of interest will be alerted.

Preferably the method includes outputting or making available information pertaining to the expressions of interest and/or the items.

Thus, the invention also provides the ability to display results of various "book building" transactions in progress, allow instant monitoring of transactions in which the user is a participant and track historical performance of current and completed transactions.

Preferably said method includes contracting with a respective prospective purchaser that said prospective purchaser will buy said respective nominated number of items at said selling price if offered said respective nominated number of items after said selling price has been established.

Thus, a prospective purchaser may agree to buy the nominated number of items at the ultimate selling price, even though that price may be greater than the nominated price in that prospective purchaser's expression of interest.

Preferably said method includes accepting said expressions of interest and outputting on demand said moving price over a computer network, such as the internet.

Thus, the invention provides a system that may be remotely accessed by any means, preferably through the internet, (i.e. open architecture) and allows any user to conduct his or her relevant tasks related to the price setting procedure associated with financial instruments. An investor, for example, can remotely register interest, an issuer can set the terms on which it will sell financial instruments and the intermediary can help its clients, either investors or issuers, as it sees fit. The invention also allows the users to dynamically participate in the price setting process as real-time information related to the sale of the financial instruments is readily available.

The method of the invention is operational in both directions. That is, an issuer may create a financial instrument to fulfil an investor need, rather than merely specify what financial instruments it has to sell; the method of the invention can also price these securities. In this situation, the investors either specify the profile of the financial instrument that they want or an investment amount and the issuers then offer various financial instruments for the investor to choose from. For example, a large pension fund may want a return of 6% on $500 million in investments. Various issuers can now offer securities with differing features to the investor (e.g. short-term bills, long-term bonds, mutual funds, etc).

According to a second broad aspect of the present invention, there is provided an apparatus for setting a selling price of each of a plurality of items to be subsequently offered for sale to a plurality of prospective purchasers, including:

input means for inputting a plurality of expressions of interest in said items, each of said expressions of interest nominating at least: i) a number of said items and ii) an offer price;

computing means for computing a moving price one or more times from a plurality of factors including at least said plurality of nominated numbers of items and offer prices;

output means for outputting said moving price on demand to said prospective purchasers; and means for establishing said selling price based on said moving price;

whereby each calculation of said moving price employs at least all of said plurality of nominated numbers of items and offer prices inputted before the computation of said respective moving price and help by said apparatus.

Preferably said apparatus is operable to set said selling price equal to the value of said moving price immediately before said items are made available for actual purchase.

Preferably said apparatus is operable to set said moving price at a minimum clearing price, being the price at which, if all expressions of interest nominating that price or higher were ultimately filled, all of said items would be sold.

Alternatively, said computing means is operable or configured to calculate said moving price as the weighted mean of said nominated offer prices, weighted according to said respective nominated number of items.

Preferably said apparatus includes withdrawal means operable to withdraw an expression of interest and/or modifying means operable to modify an expression of interest.

Thus, the withdrawal or modification of an expression of interest will alter the set of nominated numbers of items and offer prices help by the apparatus, and therefore potentially the moving price, which depends on all the nominated numbers of items and offer prices held by the apparatus.

Preferably said input means is operable to accept said expressions of interest including one or more alert criteria, and said apparatus includes alert means operable to alert said respective prospective purchaser who has input said expression of interest, if one of said alert criteria is violated.

Preferably said input means is operable to accept said expressions of interest including one or more withdrawal criteria, and to withdraw said respective expression of interest if one of said withdrawal criteria is violated.

Preferably said alert criteria and/or said withdrawal criteria include one or more of a maximum price, a minimum price, and an expiry date.

Preferably said apparatus is connectable to a computer network, whereby said apparatus is operable to accept said expressions of interest and output on demand said moving price over said computer network.

DESCRIPTION OF THE DRAWING

A preferred embodiment of the present invention will now be described, by way of example, with reference to the accompanying drawing, in which.

DESCRIPTION OF THE PREFERRED EMBODIMENT

Figure 1:
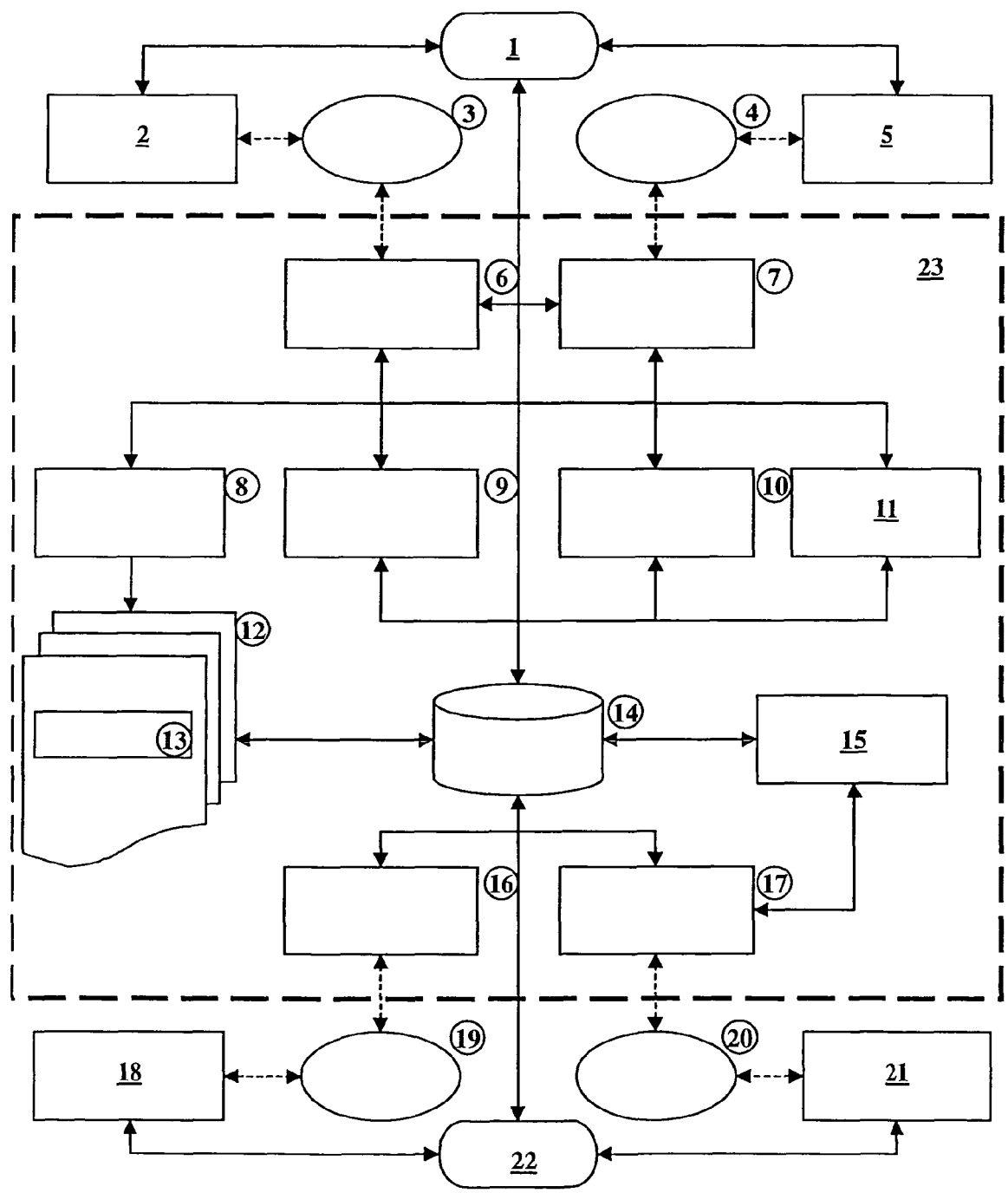
FIG. 1 is a schematic diagram of an apparatus for setting the price of a stock according to a preferred embodiment of the present invention.

A price setting apparatus according to a preferred embodiment of the present invention is shown generally at 23 in schematic form in FIG. 1, together with other apparatuses and entities in cooperation with which price setting apparatus 23 will operate.

In this figure, communications links within the price setting apparatus 23 are indicated with solid arrows, while communications links between the price setting apparatus 23 and other apparatuses or entities are indicated by dashed arrows.

Price setting apparatus 23 comprises a computer with a number of modules (which may be in the form of hardware and/or software), including intermediary control module 6, direct investor control module 7, transactions module 8, security & registration module 9, message boards 10, finance & payments module 11, rule menu 12, pricing engine 13, database 14, monitoring module 15, third party module 16 and issuer control module 17.

The price setting apparatus 23 can operate either on behalf of an issuer of a financial instrument that specifies the financial instrument that is being sold (e.g. shares, bonds, warrants, options, etc), or on behalf of an investor who specifies what their investment objectives (e.g. interest rate, industry exposure, dividend yield).

This description will use the example previously presented in the discussion of the prior art, which involved the pricing of company shares, considered to be a relatively advanced type of financial instrument. Compared to fixed interest securities, for example, the projected earnings and cash flows derived from company shares are unknown and require an increased degree of forecasting.

The pertinent details of the example scenario are summarised in the table below:

| | |
|---|---|
| Initiator: | ABC Transport Limited |
| Financial instrument: | Company shares |
| Required proceeds: | $50 million |
| Outstanding shares of the company: | 100 million |
| Company net profit: | $15 million |
| Securities dealer: | XYZ Securities Limited |

Open Architecture

An important feature of the price setting apparatus 23 is that it is designed with the flexibility that allows access by conventional means. That is, it does not require a programmed computer or interaction with a specialised hardware system. Thus, users can access the system by remote communication through the internet utilising pre-existing, generic hardware in the form of existing (e.g. personal) computers 3, 4, 19 and 20.

Computers 4 and 3 are used respectively by direct investors 5 or their intermediaries 2 to communicate with the price setting apparatus 23, including submitting expressions of interest, and ascertaining the moving price, the selling price and other information. Computers 19 and 20 are used, respectively, by third party service providers 18 (in this example securities dealer XYZ Securities Limited, acting for issuer 21) and by the issuer 21 (in this example ABC Transport Limited) to communicate with price setting apparatus 23. Such communication is by means of publicly available software (such as, which communications are conducted over the world wide web, a web browser).

The telecommunications link is also non-proprietary and can consist of regular telephone lines, cable modems, ADSL, frame relay, ISDN and any other high bandwidth data transfer means including satellite and T1, T2 and T3 telecommunications platforms.

Alternatively, if the user so wishes, participation in the offering can be by means of traditional delivery means 1 and 22, such as the post, facsimile and courier.

In the example, the securities dealer 18 would promote that they are offering shares in the issuer 21. The securities dealer 18 would inform all participants in the book building procedure that they can access this offering through a number of ways.

Remote Information Distribution

Investors in the offering can fall into one of two categories: direct investors 5 or intermediaries 2 that act on behalf of end investors.

In order for investors to access the price setting apparatus 23, they are provided with a unique account identification number with the attendant security safeguards (e.g. passwords, digital certificates). A first time investor may be required to complete and sign various documents that set out the ground rules for use of the price setting apparatus 23 and participating in the offering. Some of these ground rules may require a small deposit to be paid to participate in the offering. Once these are completed, they will be given electronic access to the price setting apparatus 23.

The security and registration module 9 of the price setting apparatus 23 establishes a secure account and the investor begins their evaluation process of seeing whether they wish to participate in the share offering. In this example, they would want to access or retrieve certain information relevant to the valuation of the shares including the prospectus, annual accounts, or any relevant contract agreements that the issuer 21 and its adviser, the securities dealer 18, wishes to make available.

Multiple Methodology Pricing Engine

In addition to valuing the shares, investors also require the terms of the offering such as how many shares are being offered. In some cases, investors will also need to know how the price is being determined. For example, some fixed interest price setting routines adopt a Dutch-auction approach. Some schools of thought also promote that the shares should be sold at a discount to reward investors so that future offerings will be well received.

The price setting apparatus 23 has a flexible rule menu 12 that allows the issuer 21 or the issuer's adviser (the securities dealer 18) to specify how the offering will be handled. The rule menu 12 sets the parameters of the offering. For example, it may allow the offering to close at a certain date and time; it may set the minimum number of shares to be offered; it may set the maximum number of shares to be offered. The rule menu 12 and corresponding parameters for the example are listed in the table below:

| Rule Menu Item | Parameter |
| --- | --- |
| Number of shares | 10 million |
| Direct investor discount | 25% |
| Minimum price for shares | $1.25 |
| Minimum price override | Yes, for direct investor discount |
| Pricing scheme | Lowest price required to clear |
| Close Time and Date | 12:00 midnight, November 15 |
| Oversubscription shares | 2 million |
| Oversubscription rule | At set price; not minimum price |
| Oversubscription allocation | Proportionate distribution |
| Oversubscription minimum | 1000 shares |

Based on the simplified rule menu 12 and the offering parameters above, the issuer 21 or the engaged securities dealer 18 has set the minimum conditions for which it will issue shares and how the price for such shares will be determined. Specifically, in the order of the rule menu 12 above:

The issuer will sell 10 million shares;

If a direct investor 5 purchases the shares, they will be entitled to a 25% discount off the final set price for the shares;

Each share must sell for a minimum of $1.25 (which means the minimum fund raising must be $25 million);

The offering will allow a minimum share price override which means if the final price to the direct investor 5 ends up being less than $1.25 minimum price due to the discount, then the shares will still be sold;

The pricing scheme adopted by the issuer is one where the lowest price indicated by the investor required to sell all of the 10 million shares will be the final set price (see SIMULTANEOUS PRICING UPDATES for further information on registration of investor interest);

The offering will close to all investors at midnight on November 15;

In the event that there is an oversubscription to the offered shares, the issuer has made a provision for the additional sale of another 2 million shares;

Any such additional share issue must be at the set price and not the minimum price (implies that a significant amount of demand exists at a particular price);

Finally, in the event of a massive oversubscription, the additional shares will be distributed in proportion to the registered interest of a particular investor subject to a minimum investment of 1,000 shares (see SIMULTANEOUS PRICING UPDATES below for more information on registration of investor interest).

As can be seen in the example above, the rules are sequenced in a logical manner as some of the rules themselves are highly dependent on each other and therefore necessary to be arranged in a particular sequence. All of the rules (or terms) that may govern an offering are arranged in an order to allow the parameterisation of the offering rules.

Equally important is that the rules menu 12 allows the pricing engine 13 of the invention to instantly compute the exact price of the share offering, as all of the parameters governing price determination are set. As can be seen from the example above, the price setting apparatus 23 can in principle, set the price of any financial instrument by means of its pricing engine 13. Other variables that the pricing engine can 13 accommodate include (but is not limited to) any, or any combination, of the following:

Minimum shares
Minimum price
Moving averages
Interest volumes
Market depth

On the basis of the rule menu 12, therefore, the price setting apparatus 23 calculates a current or moving price, which represents what the ultimate selling price would be if the market were to open at that moment. This moving price is then posted for accessing by investors 5 (or their intermediaries 2), so that they can make further expressions of interest, or modify or withdraw existing expressions of interest, based on that moving price.

Simultaneous Pricing Updates

The investors thus have the opportunity to review and evaluate the offering, and the investor may register its interest in the offering. The price setting apparatus 23 then provides the user with the range of transaction options through the transactions module 8.

The transactions module 8 allows the investor to do any of the following:

Register interest
View offering parameters
Review existing registered interest
View historical registration of interest
View current price In this example, if the investor chooses to register or modify its interest in the offering, the investor is prompted to complete various data fields, including price, number of shares and various other conditions such as stop limit orders (e.g. increase the price automatically to a maximum of x if entry price rises).

The price setting apparatus 23 immediately upon receiving the expression of interest from the investor will recompute the new price of participating in the share offering via is pricing engine 13 and display this price to all other users of the system.

If the user (i.e. intermediary 2 or direct investor 5) is participating in the offering through traditional delivery methods 1, 22 then their registration of interest can be processed by someone with access to the price setting apparatus 23 on their behalf.

Live "Book Building" Information

The price setting apparatus 23 also provides the users of the system with the ability to view other relevant information. For example, the user may want to know how many investors have registered a price greater than their registered price. This may help them assess the probability of them receiving an allocation of shares as the closing date draws near. The price setting apparatus 23 also shows the historical tracking of the clearing price for the offered financial instruments. This may help investors gain a sense of the momentum of interest in the offering.

The price setting apparatus 23 also incorporates and customises various other advanced analytics. The price setting apparatus 23, owing to its open architecture nature can be linked with other systems. This will, for example, allow the current offering to be compared with other publicly listed companies for comparison. In the example, suppose the current price was $1.25 a share. Given current net profit of $15 million and 110 million shares outstanding (after the issuance of additional 10 million to existing 100 million), this would imply a per share earnings of $0.14. At the current price of $1.25, this would represent a price-to-earnings multiple (a commonly used benchmark for value) of 9.2. This multiple of 9.2 can then be compared with other publicly listed transportation companies to assess at what price, if any, the investor would like to participate.

In addition to such quantitative information being made available by the price setting apparatus 23, the price setting apparatus 23 also can forward qualitative information as well. The price setting apparatus 23, will also have various real-time message boards 10 where all users can express their opinions and views on a particular offering. For example, the issuer 21 may wish to broadcast new developments, positive or negative, that would have an impact on the valuation of the offering. Such message boards 10 should lead to a free exchange of information and views so that the price is correctly set.

Instantaneous Alerts

Users of the system can also set up various instant alerts when certain events occur. For example, the issuer 21 through the issuer control module 17 (which is the launching pad for a range of functions the issuer can conduct through the price setting apparatus 23), can request that the price setting apparatus 23 alert the issuer 21 when an offering is say, five times oversubscribed. This would allow the issuer to perhaps consider issuing additional shares.

Perhaps an accounting firm (considered a third party service provider 18) may have an amendment to the financial statements of a company. Through the third party module 16, the accounting firm can post new statements to reflect the changes and the investors would all receive instant alerts (if by remote access, otherwise notification through traditional delivery 1, 22). The price setting apparatus 23 allows the user to specify a range of events by which the user would be notified of.

It should also be noted that for the purposes of illustration, a very abridged situation was used in the example. For instance, the rules governing a share offering can rarely be captured in a small table as previously presented and often is embodied in term sheet that can span two pages.

Also it is important to note that in many jurisdictions, such fund raising would require the involvement of a licensed securities dealer (considered a third party 18) to comply with relevant legislation. Such legislation is typically aimed at protecting investors from unscrupulous practices. However, owing to the regulation of information, the price setting apparatus 23 may lessen the role that securities dealers play in offerings of financial instruments. This would result in considerable cost savings for investors and issuers. In fact, the price setting apparatus 23 can be utilised directly by corporations to raise proceeds.

Furthermore, the price setting apparatus 23 could handle multiple offerings. That is, an investor may be able to view many different offerings and participate in one or more of them depending on the offering's merits and the investment objectives of the user. Also, it is important to note that the price setting apparatus 23 can also work in reverse whereby investors can specify what their investment criteria are and then be offered various financial instruments from issuers.

Whatever the financial instrument or investor objective the price setting apparatus 23 allows any direct applicant 5 or intermediary 2 to participate in a totally transparent offering of financial securities. The price setting apparatus 23 also allows the issuer 21 or third party service providers 18 to dynamically observe and participate in the process as well. The functionality afforded by the price setting apparatus 23 and the attendant transparency of the "book building" process dramatically reduces or eliminates current and endemic inefficiencies with the current art of fundraising.

Figure 2:
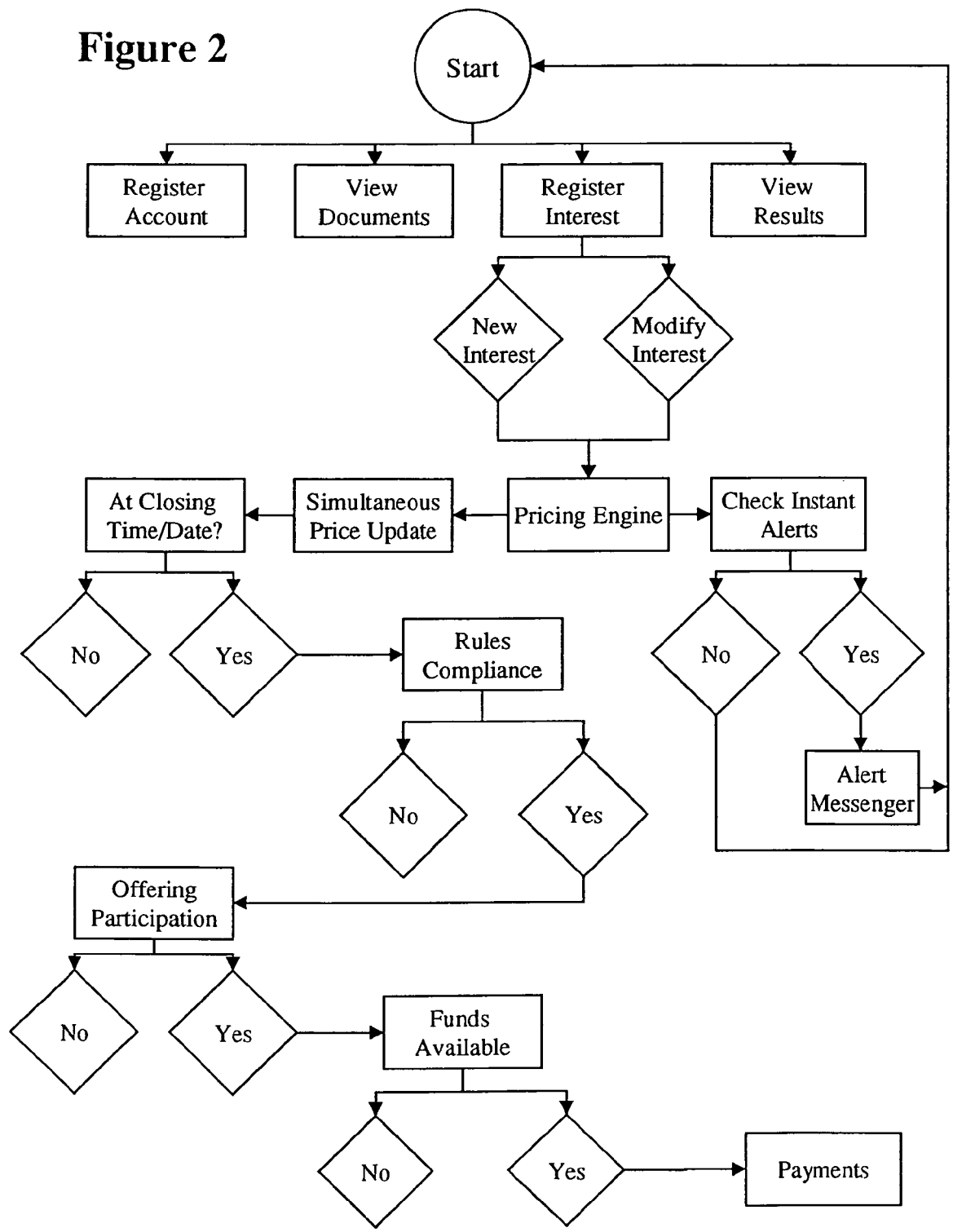
FIG. 2 is a flow chart of the operation of the apparatus of FIG. 1.

These steps are summarised by FIG. 2, a flow chart of the operation of the price setting apparatus 23 of FIG. 1.

A user starts and initially sets up an account, obtains any available information about the offering ("view documents"), and registers or modifies an expression of interest.

The pricing engine takes the new of modified expression of interest and recalculates the moving price. Then, if the closing date has been reached (i.e. the offering is about to be released), the necessary steps are effected to determine which of the users will be sold what number of shares each (including checking rule compliance and availability of funds etc).

The pricing engine also checks for any "alerts": if there are and they have been activated (e.g. because the moving price has exceeded some maximum moving price specified by a user), an alert message is issued to that user.

In summary, therefore, the benefits of the price setting apparatus according to this preferred embodiment of the invention include:

OPEN ARCHITECTURE. Users of the price setting apparatus, whether customers or third parties, do not rely on any proprietary front-end hardware or equipment (e.g. kiosks) but rather use an open architecture relying principally on the internet.

REMOTE INFORMATION DISTRIBUTION. The price setting apparatus enables users to access and/or retrieve information (private or publicly available) on a remote basis, eliminating the need for physical delivery.

MULTIPLE METHODOLOGY PRICING ENGINE. The price setting apparatus allows the "book building" process to adopt one of a number of schemes in which the price of the financial instruments is determined.

SIMULTANEOUS PRICING UPDATES. Users can obtain a response to requests in real-time for the price of, for example, financial instruments, as if those instruments were to be issued at that moment, and this price is constantly updated and available to all users.

LIVE "BOOK BUILDING" INFORMATION. In addition to price information, the users may be provided with market information on the particular pending issue of financial instruments (e.g. investor depth, price median, price means, etc).

INSTANTANEOUS ALERTS. Users of the price setting apparatus may, in the preferred embodiment, specify events at which they will be instantly notified of the event either occurring or soon to be occurring.

Modifications within the spirit and scope of the invention may readily be effected by persons skilled in the art. It is to be understood, therefore, that this invention is not limited to the particular embodiments described by way of example hereinabove.

I claim:

1. A method of setting a selling price of each of a plurality of financial instruments to be subsequently sold, comprising:
    1) using a computing device for performing steps a) to c);
        a) accepting a plurality of respective submissions nominating a number and price of said financial instruments while the financial instruments are not yet available for purchase,
        b) establishing a moving price of said financial instruments at any time while the financial instruments remain not available for purchase and while accepting said plurality of respective submissions, wherein a respective moving price represents a possible selling price for the financial instruments once the financial instruments are available for purchase, the moving price being electronically determined on the basis of parameters governing price, which parameters comprise all of said plurality of nominated numbers and prices of said financial instruments accepted before the determination of said respective moving price, and
        c) issuing the moving price on demand at any time while accepting the plurality of respective submissions, thereby allowing each respective submission of nominating number and price to be factored in the moving price; and
    2) then electronically establishing a selling price for each financial instrument to be offered for purchase; said selling price based on said moving price and issuing said selling price of each of the financial instruments to be subsequently sold.

2. The method of claim 1, wherein establishing the selling price comprises setting said selling price immediately before said financial instruments are made available for purchase in a subsequent sale.

3. The method of claim 1, wherein said establishing said moving price comprises establishing said moving price at a minimum clearing price, said clearing price being the price at which, if all nominating number of financial instruments at the clearing price or higher were ultimately filled, all of said financial instruments would be sold.

4. The method of claim 1, wherein said moving price is the weighted mean of all said prices nominated, weighted according to a respective number of financial instruments nominated.

5. The method of claim 1, wherein establishing the selling price includes a combination of rules or conditions.

6. The method of claim 5, wherein a minimum clearing price is used subject to a rule that the selling price must be between predetermined limits.

7. The method of claim 1, further comprising offering a discount to one or more individuals submitting a respective nominating price and number of financial instruments, as against those who await the establishing of the selling price before purchasing the financial instruments.

8. The method of claim 1, wherein said method includes providing a withdrawal mechanism for withdrawing a nominating price and a nominating number of financial instruments, a modifying mechanism for modifying a respective nominating price and nominating number, or both a withdrawal mechanism for withdrawing a nominating price and a nominating number and a modifying mechanism for modifying a nominating price and a nominating number.

9. The method of claim 1, wherein said accepting said plurality of respective nominating number and price of financial instruments comprises one or more alert criteria, and alerting a respective nominating individual who has submitted the respective nominating number and price, if one of said alert criteria is violated.

10. The method of claim 9, wherein said alert criteria include one or more of a maximum price, a minimum price, and an expiry date.

11. The method of claim 1, wherein accepting said plurality of respective nominating number and price comprises one or more withdrawal criteria, and withdrawing said respective nominating number and price, if one of said withdrawal criteria is violated.

12. The method of claim 11, wherein said withdrawal criteria include one or more of a maximum price, a minimum price, and an expiry date.

13. The method of claim 1, further comprising outputting or making available information pertaining to one or more of the plurality of nominating numbers and prices of the financial instruments.

14. The method of claim 1, further comprising contracting with an individual submitting the respective nominating number and price to purchase of that respective nominated number of financial instruments at that respective nominated price, when offered said respective nominated number of items after said selling price has been established.

15. The method of claim 1, further comprising accepting said nominating number and price and outputting on demand said moving price average computer network.

16. The method of claim 1, wherein said financial instruments comprise financial securities.

17. The method of claim 1, wherein said selling price is electronically based on said moving price, and the respective moving price is determined electronically on the basis of at least all of said plurality of nominated numbers of items and offer prices accepted before the determination of said respective moving price.

18. The method of claim 1, wherein said parameters further comprise one or more variables selected from the group consisting of minimum shares, minimum price, moving averages, interest volumes, and market depth.

19. An apparatus for setting a selling price of each of a plurality of financial instruments to be subsequently sold, said apparatus comprising:
    an input for inputting a plurality of submissions nominating a number and price of financial instruments while the financial instruments are not yet available for purchase;
    a computing device for computing a moving price one or more times while the financial instruments remain unavailable for purchase and while accepting the plurality of respective submissions, wherein a respective moving price represents a possible selling price for the financial instruments once the financial instruments are available for purchase, the moving price computed from parameters governing price, which parameters comprise all of said plurality of nominated numbers and prices;

an output for outputting said moving price on demand at any time while accepting the plurality of respective submissions, thereby allowing each respective submission of nominating number and price to be factored in the moving price; and a selling price determination mechanism for establishing a selling price for each financial instrument to be offered for purchase in a subsequent sale; said selling price based on said moving price, wherein said computing device employs in each computation of said moving price at least all of said plurality of nominated numbers and prices inputted before the computation of said respective moving price and held by said apparatus.

20. An apparatus of claim 19, wherein said apparatus is operable to set said selling price equal to the value of said moving price immediately before said items are made available for actual purchase.

21. The apparatus of claim 19, wherein said apparatus is operable to set said moving price at a minimum clearing price, said clearing price being the price at which, if all nominating number of financial instruments at the clear price or higher were ultimately filled, all of said financial instruments would be sold.

22. The apparatus of claim 19, wherein said computing device is operable or configured to calculate said moving price as the weighted mean of said nominated offer prices, weighted according to said respective nominated number of financial instruments.

23. The apparatus of claim 19, further comprising a withdrawal device operable to withdraw a nominating number and price, modifying device operable to modify a respective nominating number and price, or both withdrawal device operable to withdraw a respective nominating number and price and modifying means operable to modify a respective nominating number and price.

24. The apparatus of claim 19, wherein said input device is operable to accept said nominating number and price including one or more alert criteria, and said apparatus includes an alert operable to alert an individual who submitted a respective nominated number and price, if one of said alert criteria is violated.

25. The apparatus of claim 24, wherein said alert criteria include one or more of a maximum price, a minimum price, and an expiry date.

26. The apparatus of claim 19, wherein said input device is operable to accept said plurality of nominating number and price including one or more withdrawal criteria, and to withdraw a respective nominated number and price if one of said withdrawal criteria is violated.

27. The apparatus of claim 26, wherein said withdrawal criteria include one or more of a maximum price, a minimum price, and an expiry date.

28. The apparatus of claim 19, wherein said apparatus is connectable to a computer network, whereby said apparatus is operable to accept said plurality of nominating number and price and output on demand said moving price over said computer network.

29. The apparatus of claim 19, wherein said financial instruments comprise financial securities.

* * * * *